UNITED STATES PATENT OFFICE.

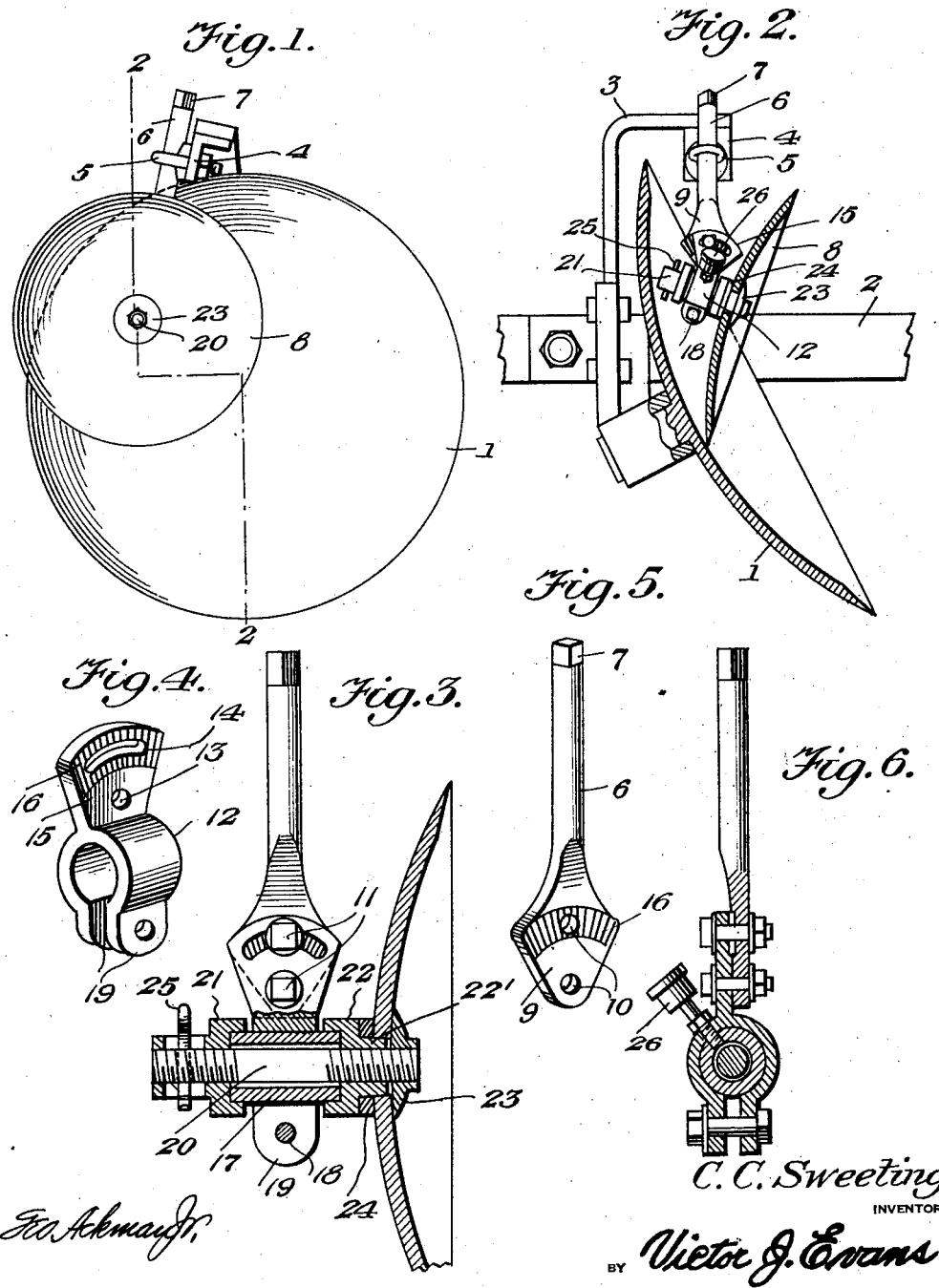

CLAUDE CLARENCE SWEETING, OF CHADWELL HEATH, ENGLAND.

PLOW.

1,391,593.  Specification of Letters Patent.  Patented Sept. 20, 1921.

Application filed October 23, 1920. Serial No. 419,032.

*To all whom it may concern:*

Be it known that I, CLAUDE C. SWEETING, a subject of the King of Great Britain, residing at Chadwell Heath, Essex, England, have invented new and useful Improvements in Plows, of which the following is a specification.

This invention relates to scrapers for plow disks, the general object of the invention being to provide simple and effective means for adjusting the scraper in relation to the plow disk.

Another object of the invention is to provide improved means for rotatably supporting the scraper disk in its supporting member.

A further object of the invention is to provide means whereby the rotating parts may be easily lubricated.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a face view showing the scraper disk in position upon the plow disk.

Fig. 2 is a section on line 2—2 of Fig. 1.

Fig. 3 is a sectional view through the scraper disk and its supporting means with parts in elevation.

Fig. 4 is a perspective view of the clamping member.

Fig. 5 is a similar view of the adjustable shank.

Fig. 6 is a vertical sectional view through Fig. 3.

In these views 1 indicates an ordinary plow disk which is suitably supported from the beam 2 of the plow. These parts may be of any ordinary or desired construction and form no part of my invention.

In carrying out my invention I provide a bracket 3 which is suitably connected with part of the plow, said bracket being of substantially L-shape with its horizontal arm uppermost. This arm carries a depending part 4 in which is arranged an eye bolt 5. A shank 6 is adjustably held by said eye bolt and the upper end of said shank is provided with a square portion 7 for receiving a wrench or the like, whereby the shank can be adjusted with but a slight slackening of the eye bolt. This shank supports the scraper disk 8 and for this purpose the lower end of said shank is provided with a flat head 9 which is provided with a pair of holes 10 to receive the bolts 11 which adjustably secure the clamping member 12 to said head. The bolts pass through the hole 13 and slot 14 in an ear 15 formed on said clamping member, the lower bolt acting as a pivot for said clamping member and the upper bolt, which passes through slot 14, acts to clamp the clamping member in adjusted position. These parts may be provided with roughened portions 16 for preventing slipping of the parts. The body of the clamping member 12 is made in the form of a split sleeve through which the bushing 17 passes, the sleeve being clamped to the bushing by means of a bolt 18, passing through the ears 19 formed on said sleeve. A shaft 20 passes through the bushing and the ends of said shaft are screw threaded to receive the caps 21 and 22 which engage the ends of the bushing. The cap 22 has a tapered extension 22′ which receives the disk 8, said disk being held on said extension by the nut 23, a washer 24 being placed between the head of the cap 22 and said disk. The cap 21 is held against rotation by means of a pin 25 which passes through suitable openings in the cap and shaft. A grease cup 26 may have its screw threaded tube passing through the clamping member and the bushing so that lubricant can be forced into the space between the bushing and shaft.

From the above it will be seen that the disk with its shaft and caps are rotatably supported by the bushing which in turn is supported by the clamping member. This clamping member is adjustably supported on the shank so that the angle of disk 8 may be adjusted relative to the plow disk. By means of the screw bolt 5 the shank 6 can be vertically adjusted so as to place the scraper disk in the proper position on the plow disk. By having the wrench receiving head on said shank the eye bolt 5 need be loosened just sufficiently to permit the wrench to turn the shank and not enough to permit the shank to drop through the eye bolt. Thus the eye bolt will hold the shank in adjusted position while the eye bolt is being tightened.

Attention is called to the fact that due to the simple arrangement of the parts there is not much danger of the dirt collecting between the scraper disk and the plow disk. This has been a serious objection to the scraper disks now in use. By having the supporting parts located between the scraper disk and the plow disk, said scraper disk will prevent the dirt from reaching said parts as will be clear from Fig. 2.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a disk plow, a bracket thereon, a shank vertically adjustable on said bracket, a clamping member connected with the lower end of said shank and adjustable about a horizontal axis, a bushing carried by said clamping member, a shaft rotatably supported by said bushing and a scraper disk carried by said shaft.

2. A scraper disk for an agricultural implement comprising a supporting bracket, a shank vertically adjustable thereon, a clamping member connected with the lower end of said shank and adjustable about a horizontal axis, a bushing carried by said clamping member, a shaft passing through the bushing, caps connected with the shaft and engaging the ends of the bushing and a scraper disk carried by one cap.

3. A scraper attachment for an agricultural implement comprising a scraper disk, a supporting frame in which the disk is rotatably mounted, said frame including a shank, a supporting bracket, an eye bolt in the bracket engaging the shank and a wrench engaging part on the shank for facilitating adjustment of the shank in the bolt.

4. A scraper attachment for agricultural implements comprising a supporting frame, a bushing in said frame, a shaft passing through the bushing, caps connected with the shaft and engaging the ends of the bushing, one cap having a tapered extension, a scraper disk engaging said extension and means for securing the disk thereon.

In testimony whereof I affix my signature.

CLAUDE CLARENCE SWEETING.